United States Patent
Sayko et al.

(10) Patent No.: US 9,531,774 B2
(45) Date of Patent: Dec. 27, 2016

(54) MULTICAST DISTRIBUTION OF INCREMENTALLY ENHANCED CONTENT

(75) Inventors: Robert J. Sayko, Colts Neck, NJ (US); Mark W. Altom, Martinsville, NJ (US); Susan Feit, Morganville, NJ (US); Douglas M. Nortz, Red Bank, NJ (US); David J. Segelstein, Aberdeen, NJ (US); John H. Zink, Manalapan, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 700 days.

(21) Appl. No.: 12/966,489

(22) Filed: Dec. 13, 2010

(65) Prior Publication Data
US 2012/0151039 A1    Jun. 14, 2012

(51) Int. Cl.
*G06F 15/173* (2006.01)
*H04L 29/06* (2006.01)
*H04N 21/2343* (2011.01)
*H04N 21/2389* (2011.01)
*H04N 21/24* (2011.01)

(52) U.S. Cl.
CPC ....... *H04L 65/4076* (2013.01); *H04L 65/1069* (2013.01); *H04N 21/2389* (2013.01); *H04N 21/234327* (2013.01); *H04N 21/2402* (2013.01)

(58) Field of Classification Search
CPC ............... H04L 12/1895; H04L 12/587; H04L 29/12301; H04L 61/2076; H04L 41/0627; H04L 41/0631; H04L 41/0645; H04L 47/33; H04L 5/0064; H04L 41/0896; H04L 45/125; H04L 12/2439; H04L 12/5602; H04L 47/52; H04L 27/2666; H04L 27/3405; H04L 2012/5632

USPC .................. 709/224, 231; 370/390
See application file for complete search history.

(56) References Cited

U.S. PATENT DOCUMENTS

| | | | |
|---|---|---|---|
| 6,215,766 B1 * | 4/2001 | Ammar | H04L 12/1886 370/229 |
| 6,292,512 B1 * | 9/2001 | Radha et al. | 375/240.1 |
| 7,391,526 B2 | 6/2008 | Nishimura | |

(Continued)

OTHER PUBLICATIONS

"Scalable Video Coding," Wikipedia, Jul. 15, 2010 http://en.wikipedia.org/wiki/Scalable_Video_Coding.

(Continued)

*Primary Examiner* — Joseph E Avellino
*Assistant Examiner* — Tsung Wu
(74) *Attorney, Agent, or Firm* — Akerman LLP; Mammen (Roy) P. Zachariah, Jr.; Michael K. Dixon (57) ABSTRACT

A system for providing multicast distribution of incrementally enhanced content is disclosed. The system may include encoding content by utilizing an incremental layer encoding algorithm to generate a low resolution base stream for content and one or more incremental streams for the content. The incremental streams may each have higher resolutions than the base stream. The system may provide the base streams and one or more of the incremental streams to a client device based on available bandwidth and based on the capabilities of the client device. Each of the streams of content may be provided to the client device by having the client device connect to one or more multicast sessions. As the streams are accessed by the client device, the client device may combine and decode the base streams, along with any accessed incremental streams, to obtain the content at an available resolution.

12 Claims, 5 Drawing Sheets

(56) References Cited

U.S. PATENT DOCUMENTS

| | | | |
|---|---|---|---|
| 7,602,723 B2* | 10/2009 | Mandato et al. | 370/236 |
| 7,684,422 B1* | 3/2010 | Sindhu et al. | 370/412 |
| 7,912,056 B1* | 3/2011 | Brassem | 370/390 |
| 7,984,179 B1* | 7/2011 | Huang | 709/233 |
| 8,151,305 B2* | 4/2012 | Doerr et al. | 725/62 |
| 8,238,253 B2* | 8/2012 | Morrill | 370/241 |
| 2003/0135863 A1 | 7/2003 | Van Der Schaar | |
| 2004/0139219 A1 | 7/2004 | Radha | |
| 2005/0129018 A1* | 6/2005 | Casaccia | H04N 19/30 370/390 |
| 2006/0259635 A1* | 11/2006 | Hisatomi | H04L 29/06027 709/230 |
| 2007/0005804 A1 | 1/2007 | Rideout | |
| 2007/0028275 A1* | 2/2007 | Lawrie | H04H 20/38 725/93 |
| 2008/0192820 A1* | 8/2008 | Brooks et al. | 375/240.02 |
| 2008/0294758 A1* | 11/2008 | Xiao | H04L 12/5695 709/221 |
| 2009/0022230 A1* | 1/2009 | Kirenko | H04N 19/61 375/240.26 |
| 2009/0100459 A1* | 4/2009 | Riedl et al. | 725/35 |
| 2010/0124271 A1* | 5/2010 | Martz et al. | 375/240.01 |
| 2011/0013538 A1* | 1/2011 | Henocq et al. | 370/253 |
| 2011/0299448 A1* | 12/2011 | Meier et al. | 370/312 |
| 2013/0044647 A1* | 2/2013 | Grancharov et al. | 370/260 |

OTHER PUBLICATIONS

Callicó et al., "Real-Time and Low-Cost Incremental Super-Resolution over a Video Encoder IP Block," http://www.iuma.ulpgc.es/users/gustavo/papers/ISQED03.pdf, Applied Microelectronics Research Institute Department of Elect. and Automatic Engineering ULPGC, Canary Islands, Spain. In ISQED, 2003.

"Adam7 Algorithm," Wikipedia, http://en.wikipedia.org/wiki/Adam7_algorithm, Jul. 15, 2010.

"Bitrate Peeling," Wikipedia, http://en.wikipedia.org/wiki/Bitrate_peeling, Jul. 15, 2010.

* cited by examiner

MULTICAST DISTRIBUTION OF INCREMENTALLY ENHANCED CONTENT

FIELD OF THE DISCLOSURE

The present disclosure generally relates to communications networks, and more particularly relates to multicast distribution of incrementally enhanced content.

BACKGROUND

A television service provider can transmit a television signal, such as through an Internet Protocol Television (IPTV) network or a cable network, to a user. The television service provider can offer the user a variety of different content and services. For example, the television service provider can supply users with real-time television programs that are typically available for the users to watch only at a specific date and time. The user may record the real-time television programs, such as with a digital video recorder (DVR), so that the programs can be viewed at a time of the user's choosing.

The television service provider can also offer the users on-demand content that is available for an extended amount of time. The on-demand content can allow a user to view a program at a time of their choosing and can be provided to the user upon request. On-demand content can be streamed from a server across the network for display on a TV in the home, or on-demand content can be downloaded to a storage device in the home and then displayed on a TV or streamed over the home network to a TV.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
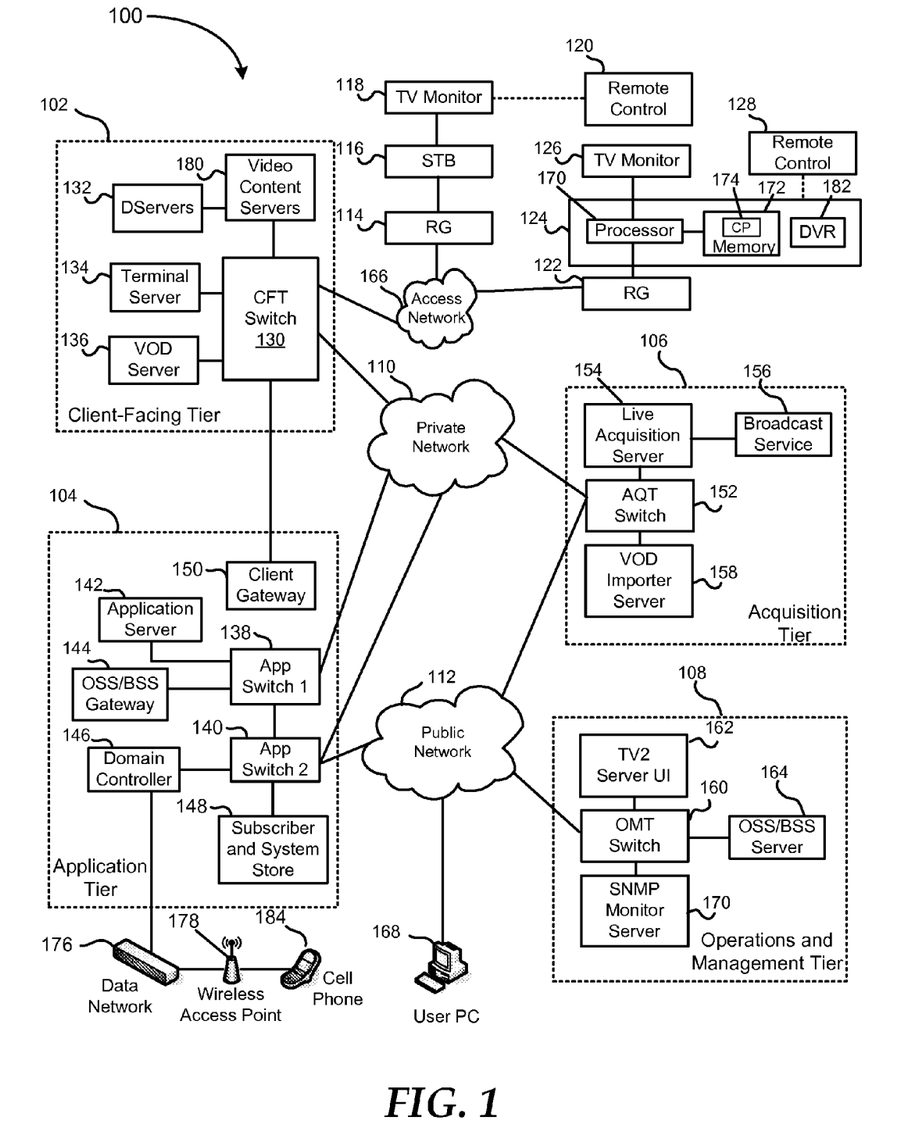
FIG. 1 is a block diagram illustrating an Internet Protocol Television (IPTV) network in accordance with one embodiment of the present disclosure.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, residential gateways (RGs) such as a first RG 114 and a second RG 122 can be coupled to the private access network 166. The client-facing tier 102 can communicate with a first representative set-top box device 116 via the first RG 114 and with a second representative set-top box device 124 via the second RG 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the RGs 114 and 122 via fiber optic cables. Alternatively, the RGs 114 and 122 can be digital subscriber line (DSL) RGs that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an operation systems and support/billing systems and support (OSS/BSS) gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes OSS data, as well as BSS data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the first set-top box device 116 access to IPTV content and VOD content. If the client gateway 150 cannot verify subscriber information for the first set-top box device 116, such as because it is connected to a different twisted pair, the client gateway 150 can deny transmissions to and from the first set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 170 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the RGs 114 and 122 via the private access network 166. The set-top box devices 116 and 124 can receive the television content from the RGs 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access point 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

Figure 2:
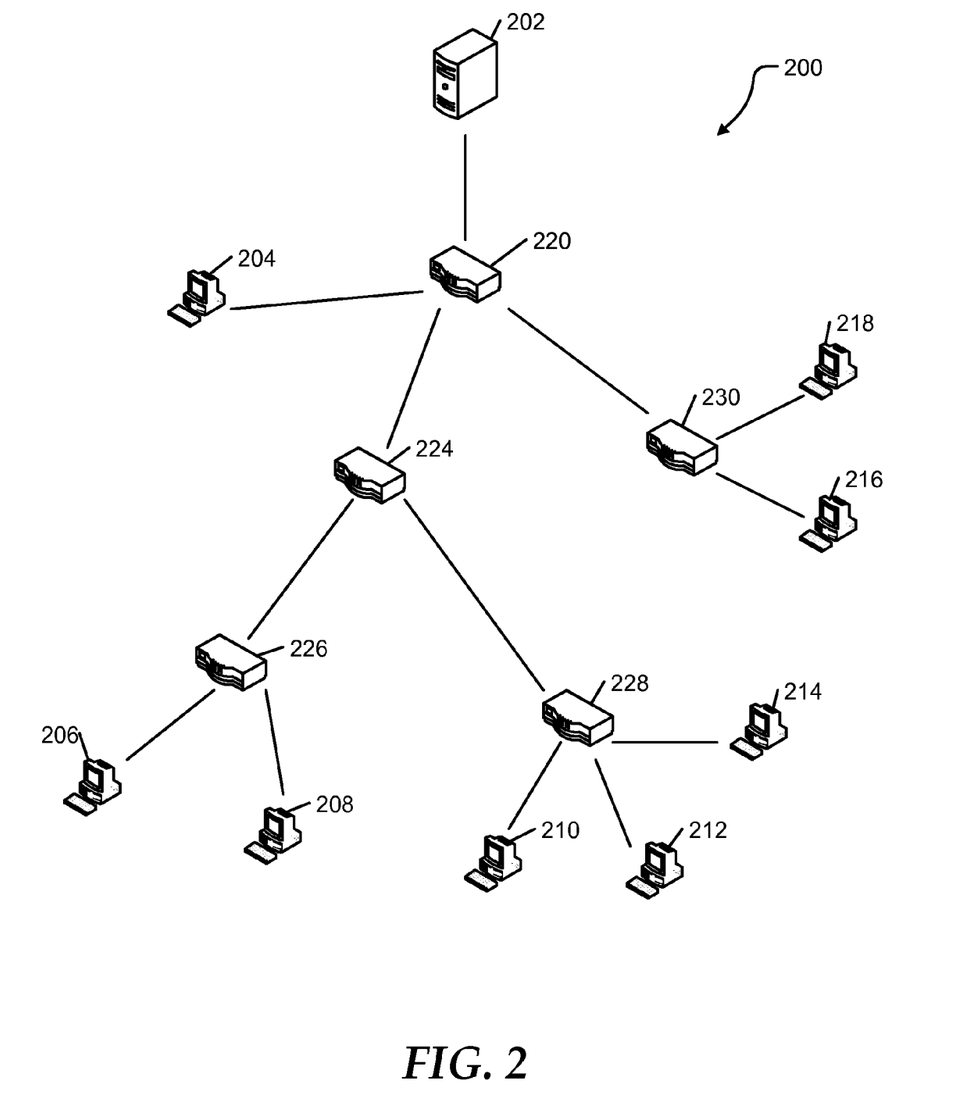
FIG. 2 is a block diagram illustrating a communications network in accordance with one embodiment of the present disclosure.

FIG. 2 shows a multicast tree 200 for distributing digital content through a geographically dispersed network, such as the Internet. Multicast tree 200 can include a server 202 and client devices 204, 206, 208, 210, 212, 214, 216, and 218. Server 202 and client devices 204, 206, 208, 210, 212, 214, 216, and 218 can communicate through a network of distribution points 220, 224, 226, 228, and 230. The distribution points 220, 224, 226, 228, and 230 may be routers. Alternatively, the distribution points 220, 224, 226, 228, and 230 may be nodes of an overlay network. For example, communications from server 202 can travel through distribution points 220, 224, and 226 to client device 208 while communications from server 202 can travel through distribution points 220 and 230 to client 216. It will be appreciated that multicast tree 200 may be a logical overlay of a mesh network that, for example, may have a direct connection from distribution point 230 to 228, and also, for example, may have a direct connection from distribution point 226 to 230. These distribution points may be multicast-enabled routers. The distribution points may have the ability to cache content not only for immediate forwarding but also for later retransmission.

Server 202 can use Internet Protocol (IP) multicast or any other multicast protocol to substantially simultaneously distribute digital content to the client devices 204, 206, 208, 210, 212, 214, 216, and 218. The digital content can be divided into multiple segments or data packets that may be, but are not necessarily IP packets, Ethernet frames, or similar lower layer packets. Using a multicast protocol, each such segment or data packet can move over each link of the network only once. The distribution points 220, 224, 226, 228, and 230 can create copies, or otherwise forward incoming data on one port to multiple outbound ports, when the paths to the destinations split. For example, server 202 can send a multicast data packet to distribution point 220. Distribution point 220 can send a copy of the data packet to each of client 204, distribution point 224, and distribution point 230. Similarly, distribution point 230 can send, forward, or route a copy of the segment, data packet, or individual low layer packets to each of client devices 216 and 218, and distribution point 224 can send a copy of the data packet to each of distribution points 226 and 228. Further, distribution point 226 can send a copy of the data packet to each of client devices 206 and 208, and distribution point 228 can send a copy of the data packet to each of client devices 210, 212, and 214. In other embodiments, the network underlying multicast tree 200 may be a shared medium, such as a bus or ring, with multicast occurring at a low network layer via common physical components and a common media access structure.

Generally, the distribution points construct or join the multicast tree 200 when client devices join a multicast group, and the server 202 may not have information about each member of the multicast group. Specifically, client devices can notify the network that they are interested in receiving data packets sent to the multicast group, such as by Internet Group Management Protocol. The server 202 can send a message addressed to the multicast group and each distribution point can replicate the data packet for each system of the multicast group.

Figure 3:
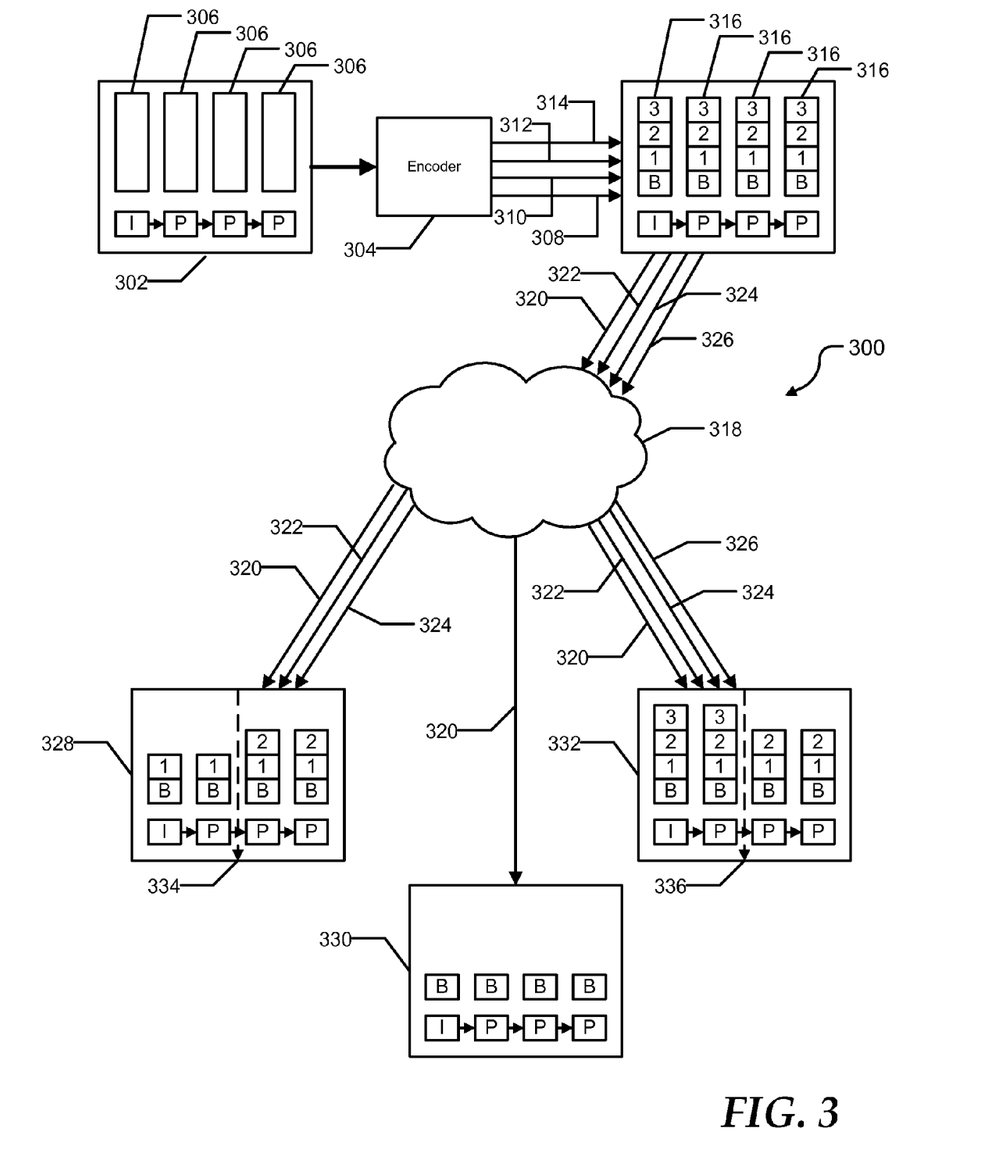
FIG. 3 is a block diagram illustrating a system for delivery of content in accordance with one embodiment of the present disclosure.

FIG. 3 illustrates an exemplary system 300 for delivery of content 302. The content 302 can be video content, audio content, or any combination thereof. The content can include broadcast content, on-demand content, or any combination thereof. The content can include a series of frames at a maximum resolution, represented by the bars 306. The content can be encoded by an encoder 304 into content streams 308, 310, 312, and 314. The encoder can use an incremental layer encoding algorithm to generate multiple lower bandwidth streams that can be added together to obtain the content in various resolutions depending on the number of streams that are combined. Streams 308, 310, 312, and 314 can include a base stream 308 and a plurality of incremental streams 310, 312, and 314. The incremental streams 310, 312, and 314 can be added to the base stream 308 to provide a higher resolution stream, as illustrated by blocks B, 1, 2, and 3 of bars 316.

Streams 308, 310, 312, and 314 can be delivered to the network 318 in multicast sessions 320, 322, 324, and 326. Multicast session 320 can deliver the base stream, multicast session 322 can deliver the first incremental stream, multicast session 324 can deliver the second incremental stream, and multicast session 326 can deliver the third incremental stream.

Client devices 328, 330, and 332 can each receive one or more of the multicast streams to obtain the content. The number of multicast sessions received by each of client devices 328, 330, and 332 can depend on the available bandwidth for the client device, the maximum resolution displayable by the client device, the resolution that has been subscribed to or purchased, or any combination thereof.

For example, client device 328 may be restricted from receiving the third incremental stream based on the subscribed resolution. That is, client device 328 may be subscribed to a standard definition television package and may be restricted from receiving high-definition content. Moreover, client device 328 may have an initial available bandwidth sufficient for only two of the multicast sessions. As such, client device 328 can initially receive multicast sessions 320 and 322. At time point 334, additional bandwidth may become available for client device 328 to begin to receive multicast session 324 to obtain the content 302 at a higher resolution than was previously displayed.

In another example, client device 330 may be limited to displaying a resolution provided by the base stream, and therefore may be limited to receiving only the base stream. For example, client device 330 may be a mobile device with a limited resolution display.

In yet another example, client device 332 may be able to receive the content at the maximum resolution, and may initially join multicast sessions 320, 322, 324, and 326. However, at time point 336, network conditions may limit the amount of available bandwidth for client device 332. For example, a rate of dropped packets or a network latency may exceed a threshold, or other applications may require a portion of the network bandwidth available to client device 332. As such, client device 332 may leave multicast session 326 and only receive the base stream and the first and second incremental streams. Thus, client device 332 may provide a lower resolution display of the content after time point 336.

Figure 4:
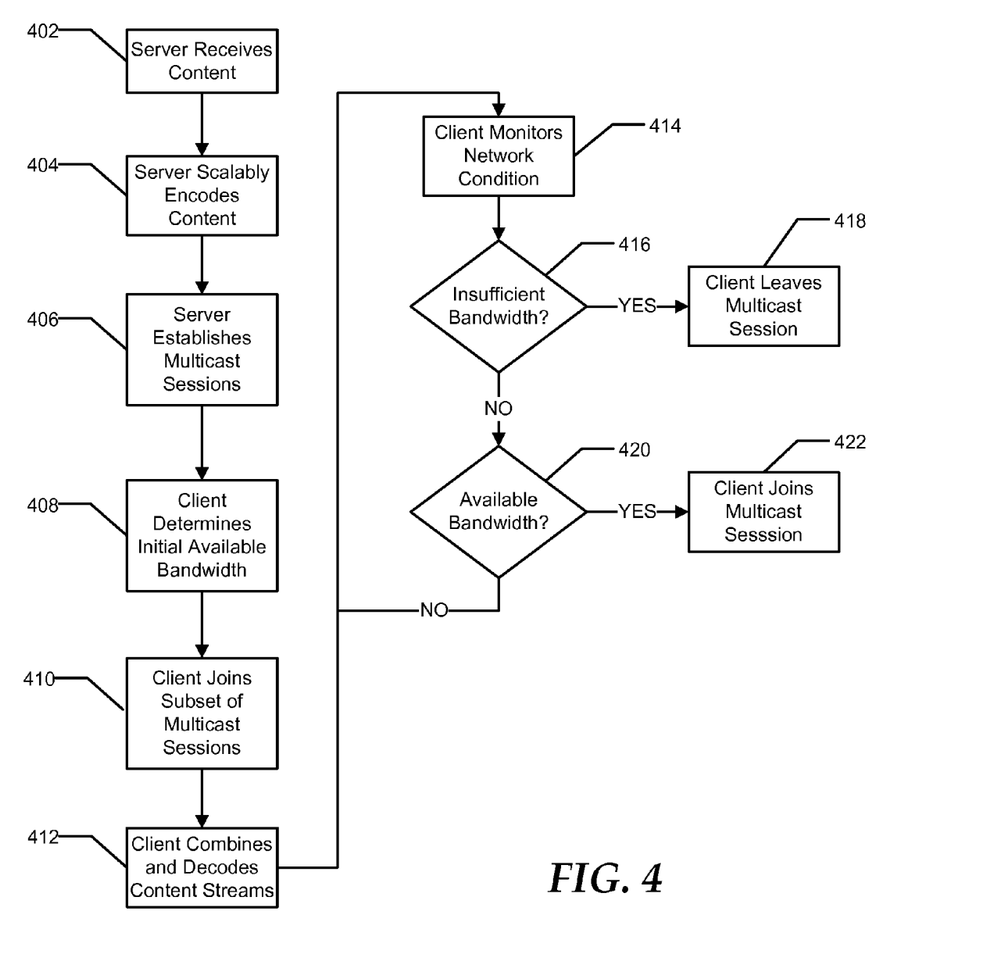
FIG. 4 is a flow diagram illustrating an exemplary method of delivering content in accordance with one embodiment of the present disclosure.

FIG. 4 illustrates a method for multicast distribution of incrementally enhanced content. At 402, the server receives content, such as audio content, video content, or any combination thereof. The content can be broadcast content, on-demand content, or any combination thereof. At 404, the server can encode the content using an incremental layer encoding algorithm. The incremental layer encoding algorithm can generate a low resolution base stream and multiple incremental streams. The incremental streams can encode additionally information such that when combined with the base stream, the combination of the base stream and the incremental streams can provide higher resolution content that provided by the base stream alone.

For example, the base stream can provide a low resolution stream suitable for playback on a portable device, such as a resolution of 480×320 pixels. Additionally, a first incremental stream, when combined with the base stream, can provide a standard definition television stream, such as a resolution of 720 by 480 pixels, while a second incremental stream, when combined with the base stream and the first incremental stream, can provide a high definition television stream, such as a 720 p (approximately 1280×720 pixels) video stream. Further, a third incremental stream, when combined with the other streams can provide a 1080 p (approximately 1920×1080 pixels) video stream.

At 406, the server can establish multiple concurrent multicast sessions to provide the content streams. Each multicast session can provide one of the base stream or incremental streams to client devices joined to the multicast session. The client devices may receive information about joining the multicast sessions and can select one or more of the multicast sessions based on network conditions and other factors.

At 408, a client device can determine an initial available bandwidth for receiving the content. For example, the client device can track an average total bandwidth and determine the bandwidth currently in use by other network applications, such as other content streams, use of the Internet, voice-over-IP streams, and the like. The initial available bandwidth can be determined from the difference between the average total bandwidth and the currently used bandwidth.

At 410, the client device can join a subset of the multicast sessions provided by the server to deliver the content. Specifically, the client device can send a request for the content and can receive information for joining the multicast sessions. Additionally, the client device can determine the number of streams that can be received within the initially available bandwidth. The client device can then join the multicast sessions to receive the base stream and, optionally, one or more incremental streams. If the initially available bandwidth is not sufficient to receive the base stream, the client device can notify the user that the content is unavailable.

In an embodiment, the client device may be limited to the number of available incremental streams. For example, a client device subscribed to standard definition content may be restricted from accessing incremental streams that can provide high definition content, but can have access to all incremental streams necessary to provide the maximum resolution standard definition content. Similarly, for purchases of standard definition content, client devices may be restricted from accessing the incremental streams necessary to provide the content in high definition. In another example, a client device may be a device with a limited resolution, such as a mobile device. The number of available incremental streams may be limited based on the screen resolution of the device. The restriction can be implemented by the server providing the client device with only the information necessary to receive the accessible streams and withholding information for joining the multicast sessions to receive the prohibited stream. Alternatively, the restriction can be implemented by the client device. For example, the client device may receive the information necessary to join all of the multicast sessions for the content, but may be configured to join only the multicast sessions for the allowable streams.

At 412, the client device can combine and decode the base stream and the optional incremental streams to obtain the content at a first available resolution. In an embodiment, the first available resolution can be less than the resolution of the device or the maximum allowable resolution, such as based on the purchased or subscribed content, due to limitations in the available bandwidth.

At 414, the client device can monitor a network condition, such as a network latency, a number of dropped packets, a currently used bandwidth, or any combination thereof. At 416, the client device can determine if there is insufficient bandwidth. At 418, when the client device determines there is insufficient bandwidth, such as when the number of dropped packets, network latency, or currently used bandwidth exceed a threshold, the client device can leave one of the multicast sessions. For example the client device can leave the multicast session providing the highest incremental stream.

Alternatively, at 420, when there is not insufficient bandwidth, such as when the network latency or the number of dropped packets is below a threshold, the client device can determine if there is additional available bandwidth. At 422, when there is additional available bandwidth, such as when the currently used bandwidth, the network latency, and the number of dropped packets are below a threshold, the client system can join an additional multicast session to receive an additional incremental stream. The additional incremental stream can be used by the client device to provide higher resolution content than was previously received. Thus, the client device can dynamically change the resolution of the content based on the current network conditions. In an embodiment, the client device can only join an additional multicast session when an additional multicast session is available such as when the client device is currently receiving content below an allowable resolution. Alternatively, returning to 420, when additional bandwidth is not available, the client device can continue to monitor the network condition at 414.

Figure 5:
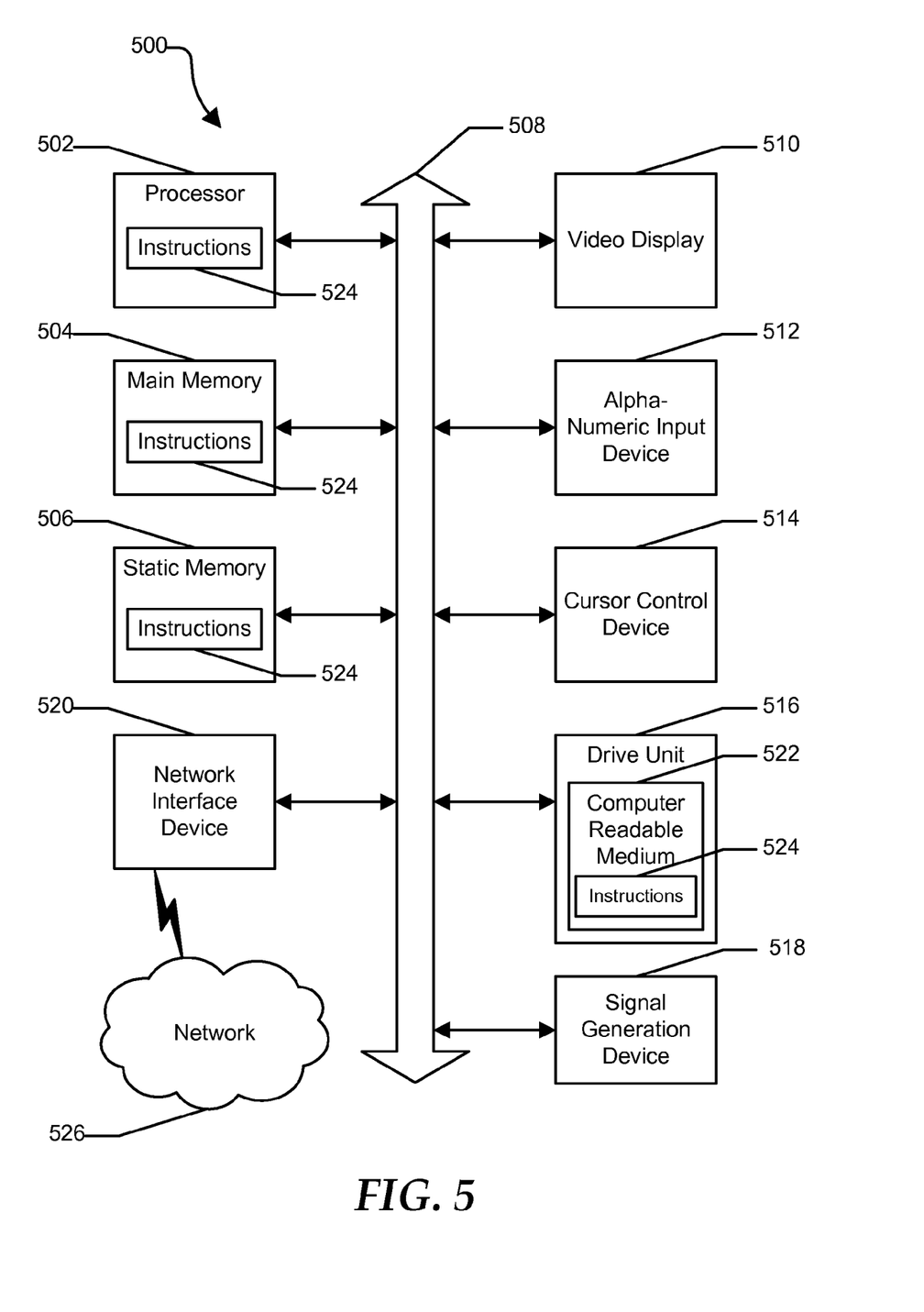
FIG. 5 is an illustrative embodiment of a general computer system.

FIG. 5 shows an illustrative embodiment of a general computer system 500. The computer system 500 can include a set of instructions that can be executed to cause the computer system to perform any one or more of the methods or computer based functions disclosed herein. The computer system 500 may operate as a standalone device or may be connected, such as by using a network, to other computer systems or peripheral devices. Examples of the general computer system can include set-top box 124, server 202, distribution point 220, client system 210, and the like.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510 such as a liquid crystal display (LCD), an organic light emitting diode (OLED), a flat panel display, a solid-state display, or a cathode ray tube (CRT). Additionally, the computer system 500 may include an input device 512 such as a keyboard, and a cursor control device 514 such as a mouse. Alternatively, input device 512 and cursor control device 514 can be combined in a touchpad or touch sensitive screen. The computer system 500 can also include a disk drive unit 516, a signal generation device 518 such as a speaker or remote control, and a network interface device 520 to communicate with a network 526. In a particular embodiment, the disk drive unit 516 may include a computer-readable medium 522 in which one or more sets of instructions 524, such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A client device comprising:
  a memory that stores instructions;
  a processor that executes the instructions to perform operations comprising:
    obtaining multicast information for a content item, the multicast information including information about joining a multicast session for a base stream and additional multicast sessions for available incremental streams;
    determining a currently used bandwidth for the client device, wherein the currently used bandwidth is determined based on first bandwidth used by a voice-over-internet protocol stream being received by the client device and second bandwidth used by a network application utilized by the client device;

determining an available bandwidth, wherein the available bandwidth is determined based on a difference between an average total bandwidth and the currently used bandwidth;

determining a number of streams that can be received by the client device based on the available bandwidth, wherein the number of streams is selected from a set of streams including the base stream and the available incremental streams;

determining a number of multicast sessions including the multicast session and the additional multicast sessions that the client device is able to receive, wherein the number of multicast sessions is determined based on the available bandwidth and a maximum displayable resolution of a display of the client device;

receiving, at the client device, information necessary to join all of the multicast sessions even when the client device is configured only to join a subset of multicast sessions corresponding to a set of allowable streams;

joining a set of initial multicast sessions based on the available bandwidth, the number of multicast sessions, the information necessary to join all of the multicast sessions, and the number of streams, wherein the set of initial multicast sessions includes the multicast session for the base stream and at least one of the additional multicast sessions for the incremental streams, wherein the set of initial multicast sessions is further based on a set of allowable incremental streams;

determining the set of allowable incremental streams based on a service level of the client device, wherein the service level includes the maximum displayable resolution of the display of the client device, wherein the set of allowable incremental streams corresponds to a subset of incremental streams necessary for the maximum displayable resolution;

monitoring a network condition;

performing actions based on the network condition, the actions comprising joining another of the additional multicast sessions and leaving one of the initial multicast sessions, wherein the actions are performed if the currently used bandwidth exceeds a threshold; and transmitting a notification that the content item is unavailable when the available bandwidth is not sufficient to receive the base stream.

2. The client device of claim 1, wherein the network condition includes one of a group consisting of a number of dropped packets, a number of out of order packets, a latency, and a combination thereof.

3. The client device of claim 1, wherein the service level includes a maximum subscribed resolution, and the set of allowable incremental streams corresponds to a subset of incremental streams necessary for the maximum subscribed resolution.

4. The client device of claim 1, wherein the service level includes a maximum purchased resolution, and the set of allowable incremental streams corresponds to a subset of incremental streams necessary for the maximum purchased resolution.

5. A computer readable device comprising a plurality of instructions, which when loaded and executed by a processor, cause the processor to perform operations comprising:

obtaining multicast information for a content item, the multicast information including information about joining a multicast session for a base stream and additional multicast sessions for available incremental streams;

determining a currently used bandwidth for a client device, wherein the currently used bandwidth is determined based on first bandwidth used by a voice-over-internet protocol stream being received by the client device and second bandwidth used by a network application utilized by the client device;

determining an available bandwidth, wherein the available bandwidth is determined based on a difference between an average total bandwidth and the currently used bandwidth;

determining a number of streams that can be received by the client device based on the available bandwidth, wherein the number of streams is selected from a set of streams including the base stream and the available incremental streams;

determining a number of multicast sessions including the multicast session and the additional multicast sessions that the client device is able to receive, wherein the number of multicast sessions is determined based on the available bandwidth and a maximum displayable resolution of a display of the client device;

receiving, at the client device, information necessary to join all of the multicast sessions even when the client device is configured only to join a subset of multicast sessions corresponding to a set of allowable streams;

joining a set of initial multicast sessions based on the available bandwidth, the number of multicast sessions, the information necessary to join all of the multicast sessions, and the number of streams, wherein the set of initial multicast sessions includes the multicast session for the base stream and at least one of the multicast sessions for the incremental streams, wherein the set of initial multicast sessions is further based on a set of allowable incremental streams;

determining the set of allowable incremental streams based on a service level of the client device, wherein the service level includes the maximum displayable resolution of the display of the client device, wherein the set of allowable incremental streams corresponds to a subset of incremental streams necessary for the maximum displayable resolution;

monitoring a network condition;

performing actions based on a change in the network condition, the actions comprising joining another of the additional multicast sessions and leaving one of the initial multicast sessions, wherein the actions are performed if the currently used bandwidth exceeds a threshold; and transmitting a notification that the content item is unavailable when the available bandwidth is not sufficient to receive the base stream.

6. The computer readable device of claim 5, wherein the network condition includes one of a group consisting of a number of dropped packets, a number of out of order packets, a latency, and a combination thereof.

7. The computer readable device of claim 5, wherein the available incremental streams are the subset of incremental streams based on the service level of the client.

8. The computer readable device of claim 7, wherein the service level includes a maximum subscribed resolution, and the available incremental streams corresponds to a subset of incremental streams necessary for the maximum subscribed resolution.

9. The computer readable device of claim 7, wherein the service level includes a maximum purchased resolution, and the available incremental streams corresponds to a subset of incremental streams necessary for the maximum purchased resolution.

10. A server comprising:
a memory that stores instructions;
a processor that executes the instructions to perform operations comprising:
receiving a request for content from a device;
determining a service level for the device;
determining available incremental streams based on the service level, the available incremental streams being a subset of incremental streams of an incremental layer encoded content, the incremental layer encoded content including a base stream and the incremental streams; and
providing multicast information to the device, the multicast information including information about joining a multicast session for the base stream and additional multicast sessions for the available incremental streams,
wherein a number of streams that can be received by the device are determined based on an available bandwidth associated with the device,
wherein the number of streams is selected from a set of streams including the base stream and the available incremental streams,
wherein a number of multicast sessions including the multicast session and the additional multicast sessions that the device is able to receive is determined,
wherein the number of multicast sessions is determined based on the available bandwidth and a maximum displayable resolution of a display of the device,
wherein information necessary to join all of the multicast sessions even when the device is configured only to join a subset of multicast sessions corresponding to a set of allowable streams is determined,
wherein the device is joined to the multicast sessions based on the available bandwidth associated with the device, the number of multicast sessions, the information necessary to join all of the multicast sessions, and the number of streams,
wherein a currently used bandwidth for the device is determined based on first bandwidth used by a voice-over-internet protocol stream being received by the device and second bandwidth used by a network application utilized by the device;
wherein the available bandwidth is determined based on a difference between an average total bandwidth and the currently used bandwidth,
wherein the set of initial multicast sessions is based on a set of allowable incremental streams,
wherein the set of allowable incremental streams is based on the service level of the device,
wherein the service level includes the maximum displayable resolution of the display of the device, wherein the set of allowable incremental streams corresponds to a subset of incremental streams necessary for the maximum displayable resolution,
wherein actions are performed based on a network condition, wherein the actions comprise joining an additional multicast session and leaving one of the initial multicast sessions, wherein the actions are performed if the currently used bandwidth exceeds a threshold; and
wherein a notification that the content is unavailable is transmitted when the available bandwidth is not sufficient for receiving the base stream.

11. The server of claim 10, wherein the service level includes a maximum subscribed resolution, and the available incremental streams corresponds to a subset of incremental streams necessary for the maximum subscribed resolution.

12. The server of claim 10, wherein the service level includes a maximum purchased resolution, and the available incremental streams corresponds to a subset of incremental streams necessary for the maximum purchased resolution.

* * * * *